United States Patent [19]
Lafferty, Sr.

[11] 3,726,533
[45] Apr. 10, 1973

[54] SPRING BIASED COUPLING FOR TOOL AND CHUCK
[75] Inventor: Gary S. Lafferty, Sr., Milwaukee, Wis.
[73] Assignee: Milwaukee Electric Tool Corporation, Brookfield, Wis.
[22] Filed: Jan. 22, 1971
[21] Appl. No.: 108,793

[52] U.S. Cl. ................................. 279/97, 279/1 B
[51] Int. Cl. ............................................. B23b 31/08
[58] Field of Search .......................... 279/97, 86, 1 B

[56] References Cited

UNITED STATES PATENTS

| 771,626 | 10/1904 | Gilman | 279/97 |
| 688,860 | 12/1901 | Kay et al. | 279/97 |
| 981,899 | 1/1911 | Taylor | 279/97 X |
| 1,423,595 | 7/1922 | Bayles | 279/97 |

Primary Examiner—Andrew R. Juhasz
Assistant Examiner—Z. R. Bilinsky
Attorney—John W. Michael, Gerrit D. Foster, Bayard H. Michael, Paul R. Puerner, Joseph A. Gemignani, Robert E. Clemency, Andrew O. Riteris and Glenn A. Buse

[57] ABSTRACT

A coupling between the shank of a tool or other accessory and a rotatable chuck is spring biased so that the tool may be coupled and uncoupled merely by applying inward or outward force to the tool. A noncircular shank on the tool has encircling it a standard locking groove which receives a locking member having a cylindrical configuration. The neck of the chuck has an axially extending bore of noncircular shape into which the shank of the tool will axially slide. The noncircular but conforming shapes of the bore and shank prevent relative free rotation therebetween. A transversely extending slot in the outside of the neck of the chuck has a depth which is enough to form an opening into the bore of the neck. A needle roller is mounted in the slot and is pressed inwardly against the relatively large bearing surfaces at the end portions of the bottom of the slot by a retaining split-ring spring so that a portion of its cylindrical surface extends into the bore in such neck. When the tool is inserted the spring gives sufficiently to allow the needle roller to move outwardly and then snap into the locking groove.

4 Claims, 2 Drawing Figures

PATENTED APR 10 1973  3,726,533

Inventor
Gary S. Lafferty Sr.
By
Attorney

SPRING BIASED COUPLING FOR TOOL AND CHUCK

BACKGROUND OF THE INVENTION

1. Field of the Invention

This invention relates generally to a retaining system between a chuck and a tool or other accessory. In particular it relates to such a system which: employs standardized components; can be manufactured at relatively low costs; and will resist wear to provide a longer useful life.

2. Description of the Prior Art

Spring biased and releasable coupling means between the shank of a tool and the chuck of a rotary tool primarily previously consisted of a spring biased ball in a radially extending hole with an inner confining lip disclosed for example in the following U.S. Patents:

U.S. Pat. No. 2,475,518
U.S. Pat. No. 2,854,831
U.S. Pat. No. 3,451,514

Also the use of a rotatable locking bolt provided with a flat is described in U.S. Pat. No. 3,456,740.

The problem with the ball arrangement is that it is difficult to drill the radially extending hole with an inner confining lip without expensive close tolerances. If uniformity is not present in the dimensions of the ball and confining lip the gripping action will be insufficient. Even worse, the lip will wear away in a relatively short time and the ball will drop through and become lost.

The trouble with the locking bolt arrangement is that it is not seatable and unlockable merely by applying inward and outward pressure on the tool.

DESCRIPTION OF THE PREFERRED EMBODIMENT

Figure 1:
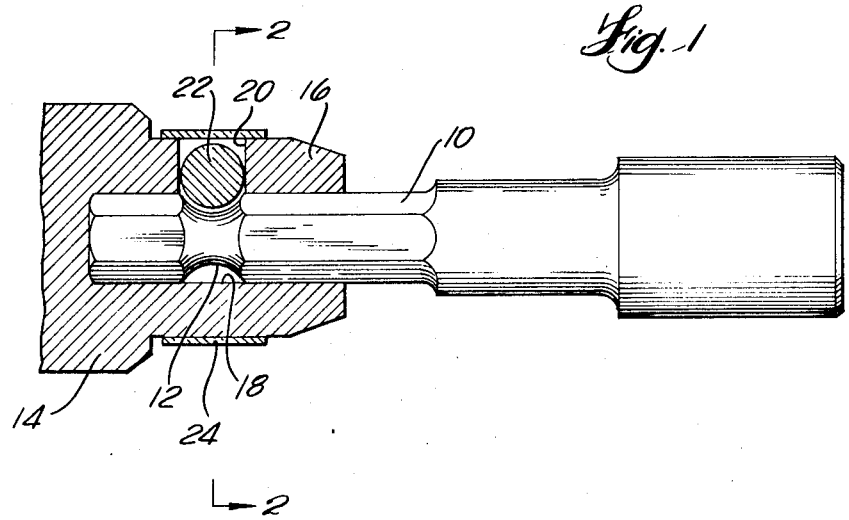
FIG. 1 is a view partly in side elevation and partly in axial cross-section of a coupling between a chuck and the shank of a tool or other accessory embodying the present invention.

Referring to the drawing by reference numerals, there is illustrated for the purpose of describing this invention a coupling system for the rotary chuck of a power tool and the shank of a standard design tool or other accessory. The tool or accessory has a shank 10 of standard well-known design. It has a hexagonal outer surface configuration with an encircling locking groove 12.

Figure 2:
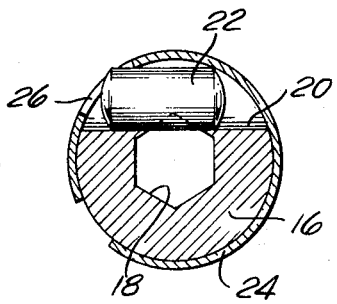
FIG. 2 is a sectional view taken on the line 2—2 of FIG. 1 with the shank of the tool removed from the chuck.

A chuck or spindle 14 has a nose 16 provided with an internal longitudinal bore 18 of hexagonal configuration to axially receive the shank 10 and provide a rotary driving connection between the chuck and tool or other accessory. There is machined or cast in the outer surface of the nose 16 a laterally extending slot 20 which extends from side to side of the nose 16 and is deep enough in radial direction to enter into the bore 18. The slot 20 as shown in FIGS. 1 and 2 extends from an opening in the outer surface to an opening in the bore 18. While not necessary for proper functioning, it is preferable to place the slot 20 so that it cuts through a vertex formed by two sides of the hexagonal bore 18. This placement provides greater cross-sectional strength at the weakened area of the nose.

A needle roller 22 of conventional design seats loosely into the slot 20 and a portion of its cylindrical surface will project into the bore 18. It is biased radially inwardly by a split-ring retaining spring 24 which bears against end portions of such needle roller. The ring 24 has an opening 26 into which an end of the roller 22 fits to keep the spring from slipping out of place.

An essential feature of this invention is the large support for the needle roller provided by the outer portions of the bottom of the slot 20. This overcomes a weakness in the prior art ball type of couplings. There is also no necessity to hold close tolerances between the slot and needle roller. In practice the slot may be machined or cast. In both instances there is a substantial decrease in cost of manufacture.

I claim:

1. A spring biased coupling for a tool or accessory, and a chuck comprising:
   a. a tool with a noncircular shank, said shank having an encircling locking groove;
   b. a chuck having a noncircular axially extending bore which is adapted to receive said shank to prevent substantial relative rotation therebetween, said chuck having a transversely and radially extending slot with a radial depth from its outer opening in the surface of said chuck sufficient to form an opening between a portion of the bottom of said slot and said bore;
   c. a cylindrically shaped member carried in said slot with a portion of its outer surface extending radially inward into said bore; and
   d. a retaining spring engaging said chuck and said member to press said member radially inwardly.

2. A spring biased coupling as defined in claim 1 wherein:
   a. said shank and said extending bore are of hexagonal cross-sectional shape; and
   b. said slot cuts through a vertex formed by two adjacent sides of the hexagonal bore.

3. A spring biased coupling as defined in claim 2 wherein the retaining spring is of split-ring configuration and engages the outer surface of said chuck, there being an opening in said spring receiving an end of said cylindrically shaped member to keep said spring from slipping out of place during normal operation.

4. A spring biased coupling as defined in claim 3 wherein the said slot has outer bottom portions providing relatively large bearing surfaces for said cylindrically shaped member.

* * * * *